May 14, 1929.  C. J. W. CLASEN  1,712,747
RAILWAY CAR TRUCK
Filed Nov. 29, 1927   2 Sheets-Sheet 2

INVENTOR
C. J. W. Clasen
BY
Evans & McCoy
ATTORNEYS

Patented May 14, 1929.

1,712,747

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed November 29, 1927. Serial No. 236,471.

This invention relates to railway car trucks and more particularly to trucks of the type in which each of the supporting wheels is mounted for independent rotation.

The invention has for its object to provide a truck of the independently mounted wheel type in which the members supporting wheels at each side of the truck may have limited independent rocking movement about a central transverse axis.

A further object is to provide means for connecting the independently movable frame members in such a manner that the frame members are securely held against relative lateral movements.

Further objects are to provide a truck in which the wheels are mounted for independent rotation which is of simple and rugged construction, easy to assemble and inexpensive to manufacture, in which rail friction, bearing friction and flange wear are reduced to a minimum and to provide a construction such that repairs to springs, wheel brakes and other parts of the truck are greatly facilitated.

With the above and other objects in view, the invention may be said to comprise the truck as illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of this specification in which Figure 1 is a plan view of the truck with the frame broken away at one corner to show the wheel axle and its bearing.

Figure 1:
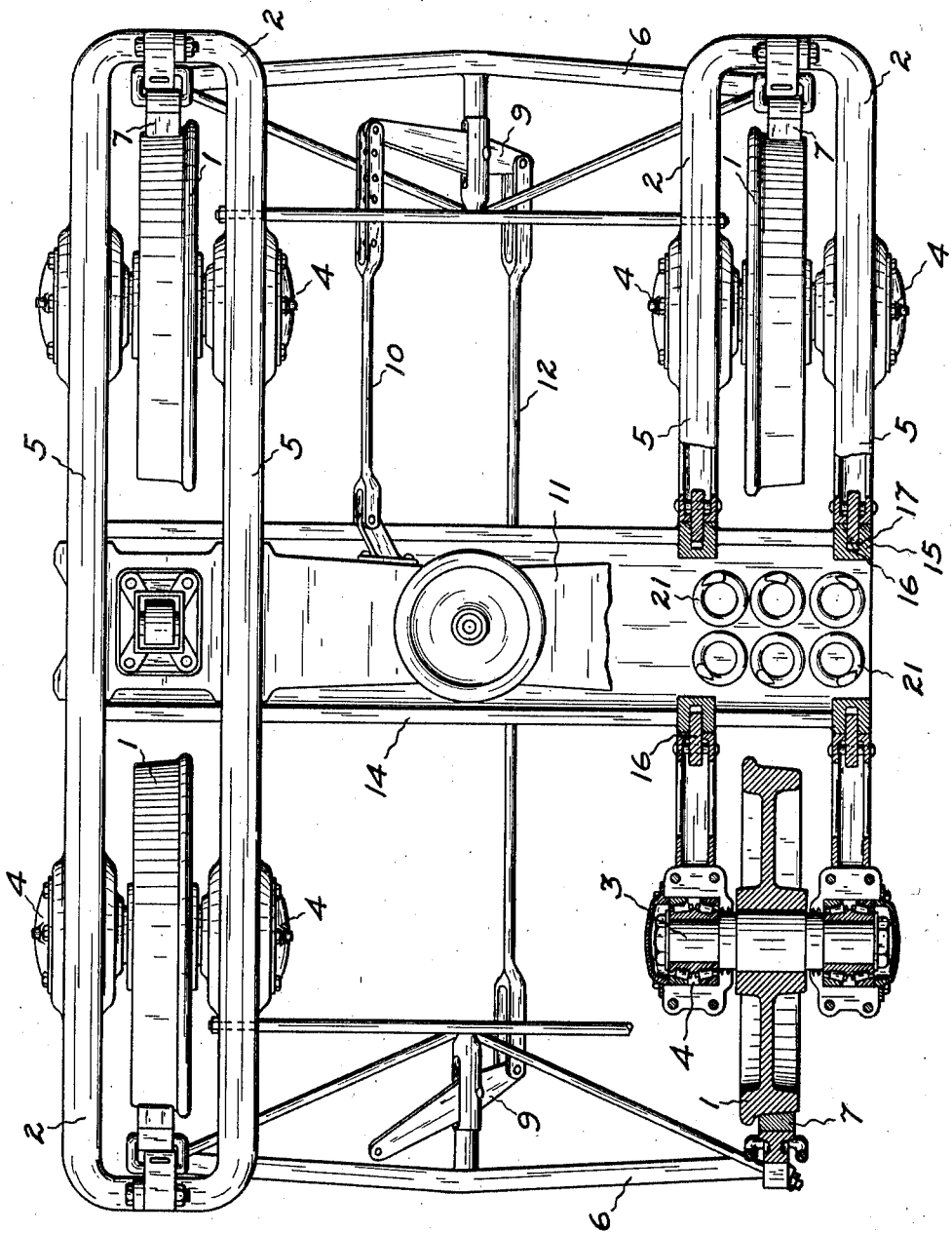
Figure 2:
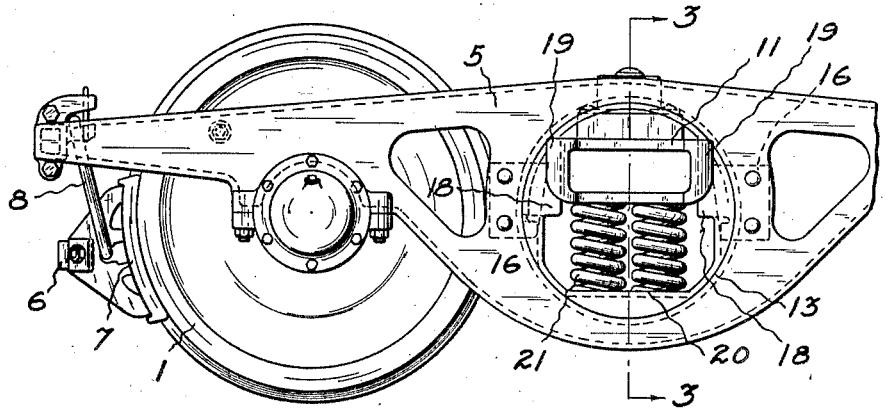
Fig. 2 is a fragmentary side elevation of the truck.
Figure 3:
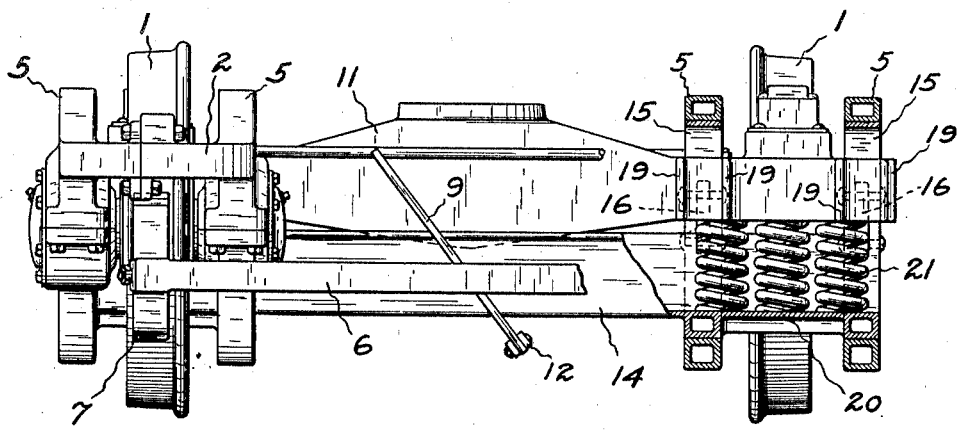
Fig. 3 is an end elevation, a portion of the truck at one side being broken away and shown in section on the line indicated at 3—3 in Fig. 2.

Referring to the accompanying drawings, the supporting wheels 1 of the truck are carried within side frames 2, which extend longitudinally of the truck at opposite sides thereof, each of the wheels being provided with an axle 3 journaled in thrust bearings 4 in the side members 5 of the side frames 2, the wheels being located between the side members 5 adjacent opposite ends of the frames. While the frame members are shown U shaped in section, it is obvious that they may be L shaped or T shaped if desired.

The frames 2 project beyond the wheels 1 at the front and rear ends of the truck and the projecting portions of the frames provide supports for brake beams 6 in front of the front wheels and at the rear of the rear wheels, the brake beams 6 carrying brake shoes 7 engageable with the wheels. The brake beams 6 are flexibly suspended from the side frames 2 by means of links 8 and are adapted to be simultaneously actuated to apply or release the brakes by means of levers 9 which are pivotally connected thereto. One of the levers 9 is adapted to be connected with the usual brake operating mechanism on the car and the other lever has its upper end connected to the truck bolster 11 by link 10, the lower ends of the levers being connected by a link 12 so that the levers are actuated simultaneously to shift the brake beams toward and away from the wheels.

Each of the frame members 5 is of truss form and of maximum depth midway between its ends and the central portion of each frame member has a cylindrical bearing opening 13 to receive the end of a transverse transom 14, which serves to rigidly tie the side frames of the truck together at the center. The transom 14 is provided at each end with a pair of annular bearing rings 15 which fit within the opening 13 of the two frame members 5 at each side of the truck and these bearing rings are held in place within the openings 13 by means of keys 16 carried by the frame and projecting into slots 17 in the bearing rings. The keys 16 lock the transom 14 against endwise movement through the openings of the frame members and the slots 17 are of a length such as to permit only a limited rocking movement of the side frames with respect to the transom. The bolster 11 is yieldably supported on the transom 14 and as will readily be understood, various bolster supporting and guiding devices may be employed which will permit independent up and down movement of opposite ends of the bolster and lateral movement of the bolster with respect to the frame members when desired. As herein shown, the opposite ends of the bolster 11 project into the bearing rings 15 of the transom and are guided for vertical movement in the transom between columns 18 which are formed integrally upon the interior of the rings 15 and which engage with opposite sides of the bolster. The ends of the bolster are provided with integral guide ribs 19, which are positioned to engage with the inner and outer sides of each of the guide columns 18. The transom 14 is provided with a flat integral web 20 at each end joining the lower portions of the bearing rings 15 and each of these webs forms a support for a series of coil springs 21 which support the bolster 11.

Figure 4:
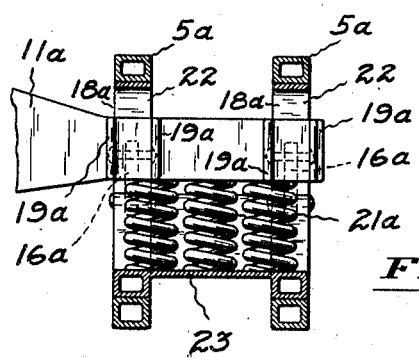
Fig. 4 is a transverse section showing the modified form of bolster support.

In some instances, it may be preferable to omit the transom and utilize other cross members for joining the side frames in which case independent rocking supports for the bolster may be provided in the side frames as shown in Fig. 4 of the drawing. In this modification, the bolster 11ª is supported at its opposite ends in bearing members mounted in the side frames at opposite sides of the truck and each bearing member consists of a pair of rings 22 mounted within the bearing openings of the side frame members 5ª and joined at the bottom by a flat integral web 23. The bearing rings 22 are provided with bolster guide columns 18ª corresponding to the guide columns 18 above described and the bolster 11ª is provided with guide ribs 19ª which engage the inner and outer sides of the columns 18ª to prevent endwise movement of the bolster in the frame members.

The bearing rings 22 are held in place and the pivotal movement of the frames limited by means of keys 16ª which are identical with the keys 16 above described and the bolster is supported by means of springs 21ª seated on the integral web 23.

Inasmuch as the wheels 1 on opposite sides of the truck are mounted in separate side frames and each of these frames is permitted to have a slight pivotal movement about the axis of the central bearing members, it will be apparent that the wheel supporting frames at the opposite sides of the truck may readily rock one independently of the other to permit all the wheels to remain in engagement with the rails in passing over portions of the track in which high or low points on one rail do not correspond with high or low points on the other, and to maintain a more equal distribution of load on the wheels of the truck.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A railway car truck having a longitudinal frame member at each side thereof, supporting wheels having separate axles mounted in the frame members adjacent each end thereof, a tie member at each end of the truck connecting said frame members, a bolster extending across the truck between central portions of the frame members, and means for yieldably supporting said bolster on said frame members, said supporting means including guides permitting the bolster to have limited vertical movements in the frame members and bearings permitting the frame members to have limited rocking movements with respect to the bolster.

2. A railway car truck having a pair of longitudinal frame members at each side thereof, a supporting wheel between the frame members of each pair adjacent each end thereof, each supporting wheel having a short axle mounted in the frame members, a tie member at each end of the truck connecting said frame members, a bolster extending across the truck between central portions of the frame members, means for yieldably supporting the bolster on said frame members, said supporting means including bearing members journaled in said frame members, bolster guides carried by said bearing members, and springs for supporting said bolster from said bearing members.

3. A railway car truck having a pair of longitudinal frame members at each side thereof, said members having central bearing openings, a supporting wheel between the frame members of each pair adjacent each end thereof, each supporting wheel having a short axle mounted in the frame members, annular bearing members fitting within said openings, integral webs joining the lower portions of the bearing members in the frame members of each pair, integral guide columns formed within the annular bearing members, a bolster having end portions projecting into said annular bearing members, guide ribs on the ends of the bolsters engageable with said columns, and springs resting on said integral connecting webs and supporting said bolster.

4. In a railway car truck, a pair of parallel longitudinal frame members at each side of the truck, one frame member of each pair being adjacent the wheels on the outer side thereof and the other frame member of each pair being on the inner side of the wheels, said frame members having alined centrally disposed circular bearing openings, a transom having bearing rings at opposite ends thereof fitting in the openings of the frame members, a bolster mounted in the transom, springs interposed between the transom and bolster for yieldably supporting the bolster, interengaging means on the transom and frame members for holding the transom against endwise movement in the frame members, and interengaging means between the transom and bolster to limit the endwise movement of the bolster in the transom.

5. In a railway car truck, a pair of parallel longitudinal frame members at each side of the truck, one frame member of each pair being adjacent the wheels on the outer side thereof and the other frame member of each pair being on the inner side of the wheels, said frame members having alined centrally disposed circular bearing openings, a transom having bearing rings at opposite ends thereof fitting in the openings of the frame members, guide columns carried by the transom within said rings, a bolster mounted in the transom, said bolster having end portions projecting into said rings and guide ribs on said end portions engageable with said columns, supporting springs interposed between the ends of said bolsters and said transom, and means carried by the frame members for holding the transom against endwise movement and for limiting the turning movement of the frame members on the transom.

In testimony whereof I affix my signature.

CLAUS J. WERNER CLASEN.